United States Patent [19]

Vasishth et al.

[11] 4,036,816

[45] July 19, 1977

[54] PRODUCTION OF NOVEL THERMOSETTING PHENOL-FORMALDEHYDE RESINS BY CONTROLLED ACID REACTION

[75] Inventors: Ramesh C. Vasishth, Burnaby; Pitchaiya Chandramouli, Richmond, both of Canada

[73] Assignee: Cor Tech Research Limited, Richmond, Canada

[21] Appl. No.: 636,576

[22] Filed: Dec. 1, 1975

Related U.S. Application Data

[63] Continuation of Ser. No. 421,068, Dec. 3, 1973, abandoned.

[30] Foreign Application Priority Data

Dec. 14, 1972 United Kingdom ............... 57762/72

[51] Int. Cl.$^2$ .......................... C08G 2/28; C08G 2/30
[52] U.S. Cl. .................................... 260/59 R; 260/52; 260/57 R
[58] Field of Search ...................... 260/52, 57 A, 59 R

[56] References Cited

U.S. PATENT DOCUMENTS

| | | | |
|---|---|---|---|
| 3,485,797 | 12/1969 | Robins | 260/57 |
| 3,501,552 | 3/1970 | Robins | 260/52 X |
| 3,535,185 | 10/1970 | Tveten | 260/57 A |

FOREIGN PATENT DOCUMENTS 927,041  5/1973  Canada

Primary Examiner—Edward M. Woodberry
Attorney, Agent, or Firm—Sim & McBurney

[57] ABSTRACT

A novel thermosetting phenol-formaldehyde resin having a preponderance of benzyl ether linkages is characterized by its infra-red spectrum which exhibits absorption at wave numbers of about 1010 cm$^{-1}$, 1050 cm$^{-1}$ and 1230 cm$^{-1}$. The infrared spectrum has a particular ratio of absorbance at 1010 cm$^{-1}$, measured from a base line drawn between wave members of 1030 cm$^{-1}$ and 950 cm$^{-1}$, to that at 1230 cm$^{-1}$, measured from a base line drawn between wave numbers of 1130 cm$^{-1}$ and 1310 cm$^{-1}$ which is less than about 0.1. These novel resins are prepared by the controlled addition of strong acids to thermosetting phenol-formaldehyde resins having a preponderance of benzyl ether linkages and an infrared spectrum exhibiting large adsorption at wave numbers of 1230 cm$^{-1}$, 1050 cm$^{-1}$ and 1010 cm$^{-1}$, causing a decrease of at least 35% in the ratio of absorbance at 1010 cm$^{-1}$, measured from a base line drawn between wave numbers of 1030 cm$^{-1}$ and 950 cm$^{-1}$ to that at 1230 cm$^{-1}$, measured from a base line drawn between wave numbers of 1130 cm$^{-1}$ and 1310 cm$^{-1}$, while leaving substantially unaltered the absorbance at wave numbers of 1230 cm$^{-1}$ and 1050 cm$^{-1}$. The novel resin is capable of many applications and is normally tack-free, although the tack may be controlled by the addition of an organic solvent, such as phenol, thereto.

16 Claims, 10 Drawing Figures

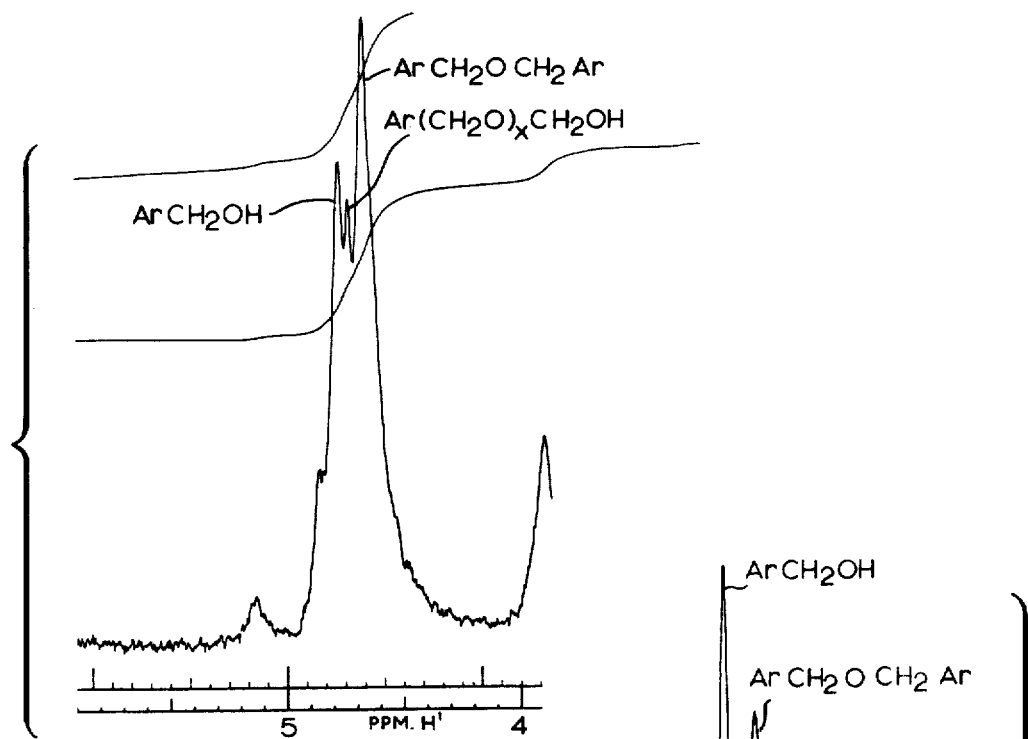
FIG. 2A
FIG. 2B
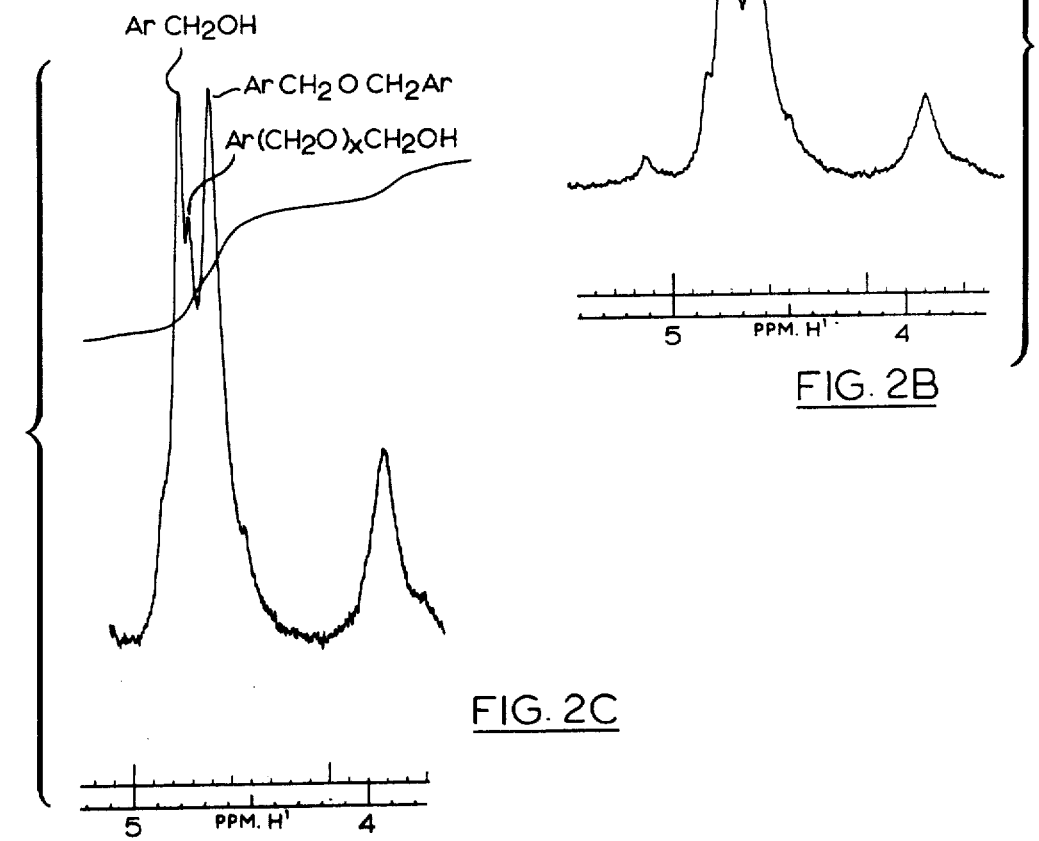
FIG. 2C

PRODUCTION OF NOVEL THERMOSETTING PHENOL-FORMALDEHYDE RESINS BY CONTROLLED ACID REACTION

This is a continuation of application Ser. No. 421,068 filed Dec. 3, 1973 now abandoned.

FIELD OF INVENTION

The present invention is directed to novel phenol-formaldehyde thermosetting resins, their preparation and uses.

BACKGROUND TO THE INVENTION

Caustic-free, thermosetting phenol-formaldehyde resins have been prepared by combining one mole of phenol with more than one mole of formaldehyde in the presence of a suitable catalyst such as CaO or MgO. These resins are water-miscible in the initial stages of the reaction, but become progressively less miscible with water as the reaction proceeds. On still further polymerization, the resins become water-insoluble. Whether these resins are made with small or large average size molecules, they suffer from the extreme disadvantage of very limited storage lives at usual ambient temperatures so much so, that they have to be often stored and shipped under refrigeration.

Chemically, these caustic-free phenol-formaldehyde resins may be described as a series of phenolic rings joined by methylene linkages, randomly at ortho or para positions, relative to the phenolic hydroxyl group, and having reactive terminal methylol groups, also randomly ortho or para to the phenolic hydroxyl.

The structure of these resins may be represented by the following formula I:

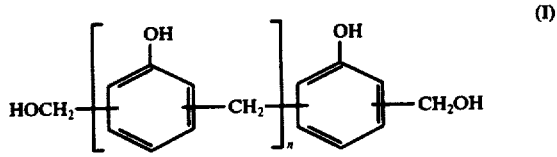

(I)

It is also known to form a thermosetting phenol-formaldehyde resin of a different type by reaction of one mole of phenol with one or more moles of formaldehyde in the presence of a catalyst in an aqueous reaction medium, the catalyst being a salt of a monocarboxylic acid with a metal of the group of Transition Elements of the Periodic Chart of Elements, hereinafter referred to as a "metal carboxylate catalyst".

The catalysts employed may be salts of monocarboxylic acids with metals selected from the group of Transition Elements of the Periodic Chart of Elements, such as zinc, manganese, cobalt, nickel, iron, chromium and the like. Suitable acid moieties of this catalyst may be selected from the group of formic acid, acetic acid, propionic acid, capronic acid, caprylic acid and capric acid and others. The preferred salts are zinc acetate and manganese acetate.

The amount of formaldehyde used may be in the range from 1 mole to 3 moles per mole of phenol. A preferred mole ratio is in the range 1.5 moles to 2.2 moles of formaldehyde per mole of phenol. The amount of catalyst used may be varied over a large range but quantities as low as 0.02 to 0.2 mole ratios are sufficient.

These prior art resins are produced by a two-stage reaction, in which an initial exothermic stage is carried out at a temperature of from about 60° to about 80° C until heat output ceases, and then the temperature is raised to about 90° to about 100° C and maintaned thereat until the desired degree of polymerization is achieved.

These latter prior are resins are characterized by the presence of dibenzyl ether linkages of the type:

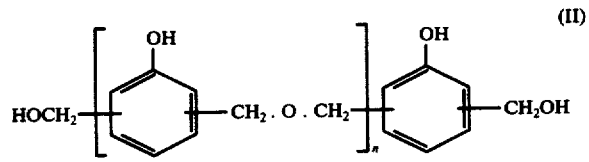

(II)

and the resin molecules consist primarily of ortho-ortho substitution.

These prior art resins are thermosetting and form infusable insoluble brittle masses on the application of heat, accelerated, if desired, by the addition of small quantities of organic or inorganic acids, for example, benzene sulfonic acid, toluene sulphonic acid or sulfuric acid. The resins are characterized by an infra-red spectrum which displays large absorption peaks at wave members of 760 cm$^{-1}$ (ascribed to ortho-ortho substitution), 1010 cm$^{-1}$ (ascribed to methylol groups), 1050 cm$^{-1}$ (ascribed to the ether groups) and 1230 cm$^{-1}$.

While the above formula (II) is ascribed to these prior art resins, as will become more apparent below, the end groups do not appear to be wholly methylol groups but contain hemiformal groups.

SUMMARY OF INVENTION

In the present invention, there is produced from this latter prior art phenol-formaldehyde resin an entirely different phenol-formaldehyde resin by the controlled addition of acid thereto. The novel thermosetting phenol-formaldehyde resin produced thereby contains a preponderance of benzyl ether linkages ortho to the phenolic hydroxyl groups and is characterized by an infra-red spectrum which displays large adsorption peaks at wave numbers of approximately 1050 cm$^{-1}$ and 1230 cm$^{-1}$, the ratio of absorbance at a wave number of 1010 cm$^{-1}$, measured from a base line drawn between wave numbers of 1030 cm$^{-1}$ and 950 cm$^{-1}$, to that at a wave number of 1230 cm$^{-1}$, measured from a base line drawn between wave numbers of 1130 cm$^{-1}$ and 1310 cm$^{-1}$ which is less than about 0.1. The novel resin product produced in this invention is relatively stable at room temperature, i.e. it has substantially no tendency to cure on prolonged standing at room temperature, and may be thermoset by the application of heat.

GENERAL DESCRIPTION OF INVENTION

It is extremely surprising that the novel product of the invention may be formed from the latter prior art resin, which is described in Canadian U.S. Pat. No. 927,041. As mentioned above the presence of small quantities of organic or inorganic acids accelerate the rate of curing of the latter resins when such resins are cured by the application of heat.

In accordance, therefore, with one embodiment of the present invention, the prior art thermosetting phenol-formaldehyde resin containing benzyl ether linkages ortho to the phenolic hydroxyl groups, is crosslinked to a thermoset state in two stages involving entirely separate reactions, the first stage involving the addition of controlled amounts of strong organic or inorganic acids to the resin, generally at room temperature, to form the novel resin of the present invention. Thereafter, the novel resin is cured rapidly to the thermoset state by the use of heat and/or additional quantities of acid, preferably under pressure. These cure times are very much shorter than those of the prior art resin. The cure time may be decreased even further by addition of acid to the novel resin prior to the curing.

A wide range of organic and inorganic acids may be employed in the method of the invention and include aryl sulfonic acids, such as benzene sulfonic acid and toluene sulfonic acid and inorganic acids such as phosphoric acid, sulfuric acid, together with mixtures of two or more of such acids. A wide range of acid quantities may be employed, depending on the strength of the acid and the temperature employed, for example, for toluene sulfonic acid, the quantity of acid may vary from about 0.25 to about 1.5%, preferably about 0.5 to about 1% by weight of the resin at room temperature. Generally, the mole ratio of formaldehyde to phenol used to form the prior art resin for use in the present invention is at least about 1.5:1. particularly about 1.5:1 to about 2:1.

BRIEF DESCRIPTION OF DRAWINGS

FIGS. 2A, 2B and 2C are nuclear magnetic spectra showing changes in adsorption with time upon addition of acid to the same prior art phenol-formaldehyde resin as in FIGS. 1A to 1C;

DESCRIPTION OF PREFERRED EMBODIMENTS

The changes which occur upon addition of acid to a prior art phenol-formaldehyde resin having benzyl ether linkages ortho to the phenolic hydroxyl group is illustrated by the following observations. The prior art resin was made according to the following procedure from 1 mole of Phenol and 1.6 moles of formaldehyde. To a suitable reaction flask equipped with heating and cooling means and agitation means were added 1 mole of phenol and 1.6 moles of formaldehyde as an aqueous solution thereof and 0.05 moles of zinc acetate. Agitation was started and the mixture heated to 70° C for 20 minutes. The reaction mixture was held at 70° C until the exotherm subsided. The reaction mixture was then heated to 100° C and held at 100° C for 210 minutes. The reaction mixture separated into two layers during the reaction period. The resin was observed to be a high viscosity, tacky liquid of viscosity greater than 50,000 cps at 75° F.

To the later resin was added 1% by weight of the resin of toluene sulfonic acid used as a 50% aqueous solution thereof. The mixture was maintained at a room temperature of about 70° F and samples were withdrawn 5 minutes and 2¼ hours after acid addition and their infrared spectra obtained. The three spectra obtained are shown in FIG. 1.

Figure 1A:
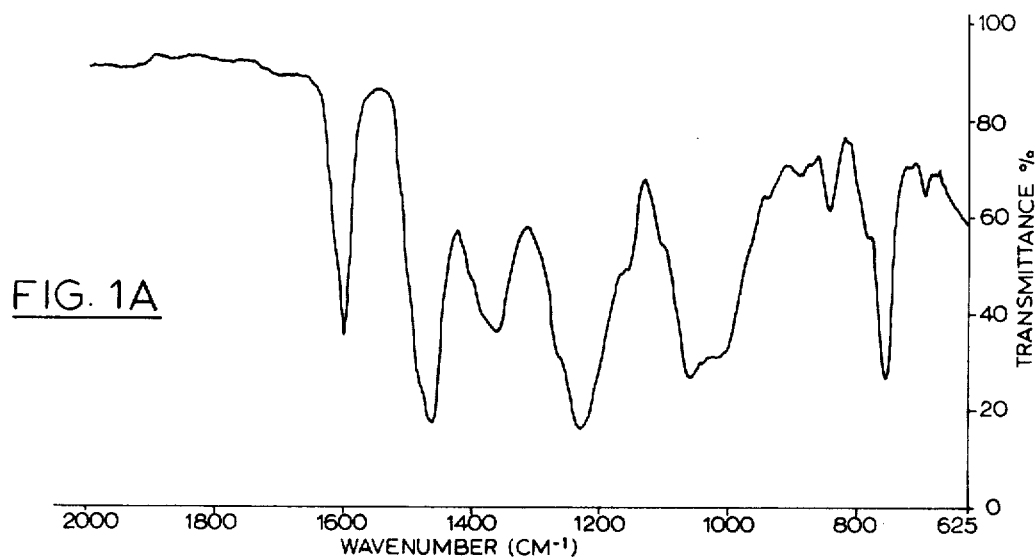
FIGS. 1A, 1B and 1C shown infrared spectra of changes in adsorption with time upon addition of acid to a prior art phenol-formaldehyde resin contaning benzyl ether linkages ortho to the phenolic hydroxyl groups.
Figure 1B:
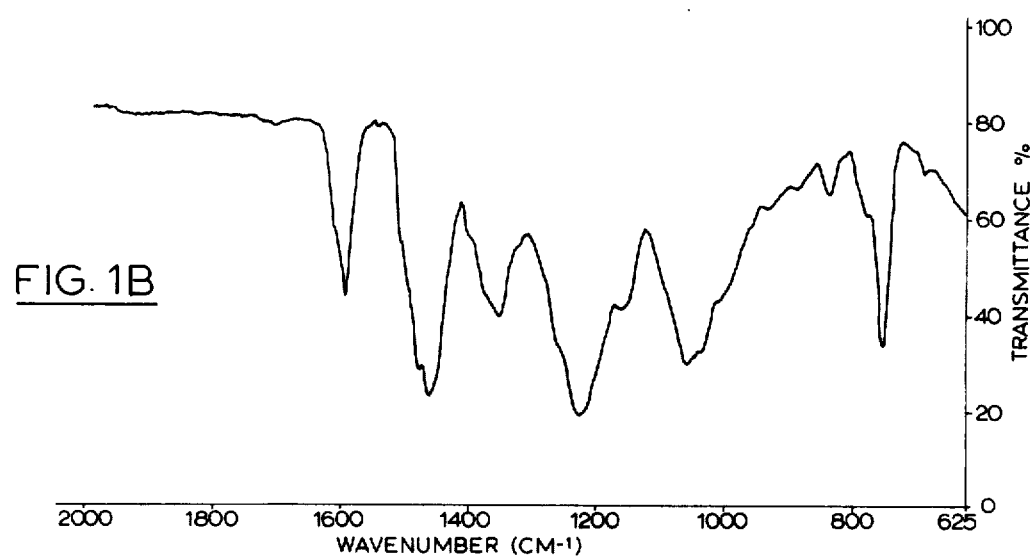
Figure 1C:
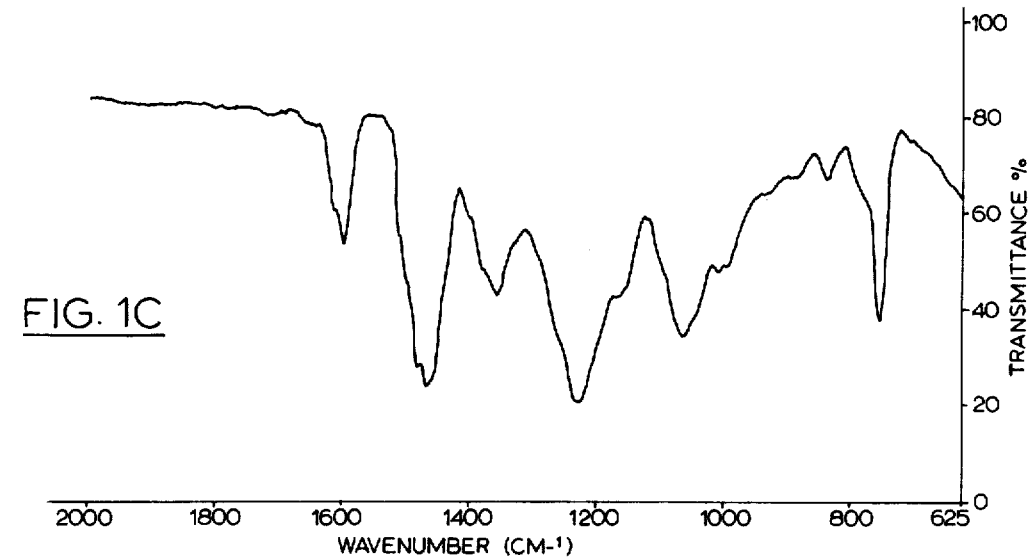

A study of infrared spectra of FIG. 1 shows that the starting resin exhibits large absorption peaks at about 1010 cm$^{-1}$, 1050 cm$^{-1}$ and 1230 cm$^{-1}$ and, upon addition of acid, that there is an almost instant decrease in the absorbance at 1010 cm$^{-1}$. It was observed that this is accompanied by some formaldehyde evolution. This instant decrease in the absorbance value at 1010 cm$^{-1}$ may be attributed to either the crosslinking of any residual terminal methylol groups or to the breakdown of hemi-formal side chains. Since methylol groups are not likely to react instantly on addition of such small quantities of acid as 0.5 to 1% para-toluene sulfonic acid at room temperature, the sudden decrease of absorbance at 1010 cm$^{-1}$ must be attributed to some reaction other than methylol condensation.

The structure attributed to the starting resins is shown above in formula (II), This attributed structure does not take into account the fact that under the conditions used for carrying out the reaction forming the resin, a substantial amount of benzyl hemiformals are likely to be formed.

The formation and existence of benzyl hemiformals under such conditions is reported by Woodbrey et al in the Journal of Polymer Science, Part A, Vol. 3, pp 1079-1106 (1955). It is also reported that such hemiformals cleave readily on simple acid addition. Consequently, it is most likely that in the resin of formula (II), the end groups cannot only be hydrogen or a simple methylol group but also a benzyl hemiformal, providing a structure illustrated by formula (III).

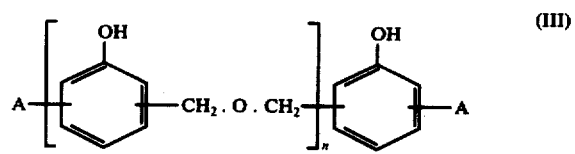

wherein A is —CH$_2$[OCH$_2$]$_x$—OH, —CH$_2$OH or —H, where $x$ is an integer.

The prior art resins, therefore, are properly characterized as containing benzyl ether linkages and benzyl hemiformal groups ortho to the phenolic hydroxyl groups.

On the addition of acid to such resins, the hemiformal will yield a methylol group, simultaneously releasing the formaldehyde tied up in the side chain, thereby accounting for the observation of the release of formaldehyde upon addition of the acid.

It is possible that some of the end groups —A are simple methylols and others are benzyl hemiformals. On acid addition at room temperatures in concentrations as low as 0.5% of toluene sulfonic acid of the weight of the resin, the immediate primary reaction, however, would involve the breakdown of the hemiformals, with formaldehyde release.

Since formaldehyde is released upon acid addition and in view of the lower pH conditions prevailing, other side reactions in all likelihood take place. Thus, at least some of the formaldehyde released probably reacts into the resin structure or reacts with any free phenol present. The IR spectra in FIG. 1 also show that there is a decrease in the absorbance of 690 cm$^{-1}$ upon addition of acid indicating a decrease in the concentration of free phenol present in the resin. Probably there is also a decrease in the concentration of other monomeric methylol phenols present.

A further examination of the IR spectra of the acid modified resin as shown in FIG. 1 shows that there is substantially no decrease in the absorbance at 1230

$cm^{-1}$ and 1050 $cm^{-1}$. This absorbance is attributed to the dibenzyl ether groups.

It is, therefore, concluded that the dibenzyl ether groups are not affected by acid addition at room temperature. In the light of the IR data presented in FIG. 1 and the foregoing discussion, it is evident that a new thermosetting phenol formaldehyde resin having a preponderance of benzyl ether linkages ortho to the phenolic hydroxyl groups, and, which exhibits substantially less absorption at 1010 $cm^{-1}$ in the IR spectrum than the starting resin, typically exhibiting a decrease in ratio of absorbance at 1010 $cm^{-1}$ measured from a base line drawn between wave numbers of 1030 $cm^{-1}$ and 950 $cm^{-1}$, to that at 1230 $cm^{-1}$ measured from a base line drawn between wave numbers of 1130 $cm^{-1}$ and 1310 $cm^{-1}$ of at least 35%, preferably about 60 to about 95%. In the novel resin, the ratio is less than about 0.1, typically less than about 0.07. Thus, the new resin is chemically different from the prior art starting resin, and is obtained by the simple addition of controlled quantities of at least one strong acid to the starting resin.

The new resin has a lower content of small molecular weight compounds and a somewhat higher average molecular weight than the starting resin. It is also chemically different from the starting resin, in that the benzyl hemiformals thereof have been replaced by methylol groups.

It is apparent, therefore, from the above discussion that the structure attributed to the prior art phenol-formaldehyde resins as outlined above in formula (II) is probably inaccurate and the structure of those resins is more likely to be that depicted in formual (III).

Figure 3A:
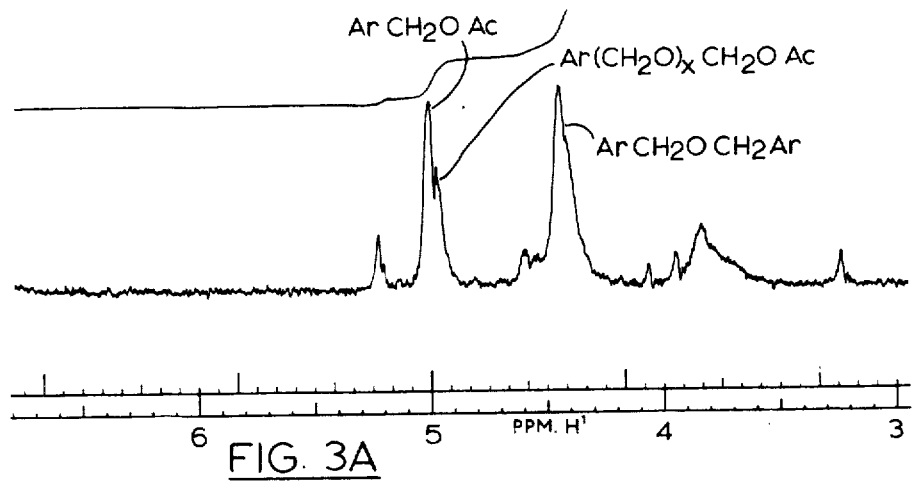
FIGS. 3A, 3B and 3C are nuclear magnetic spectra similar to FIGS. 2A, 2B and 2C with the exception that the resins are in an acetylated form.
Figure 3B:
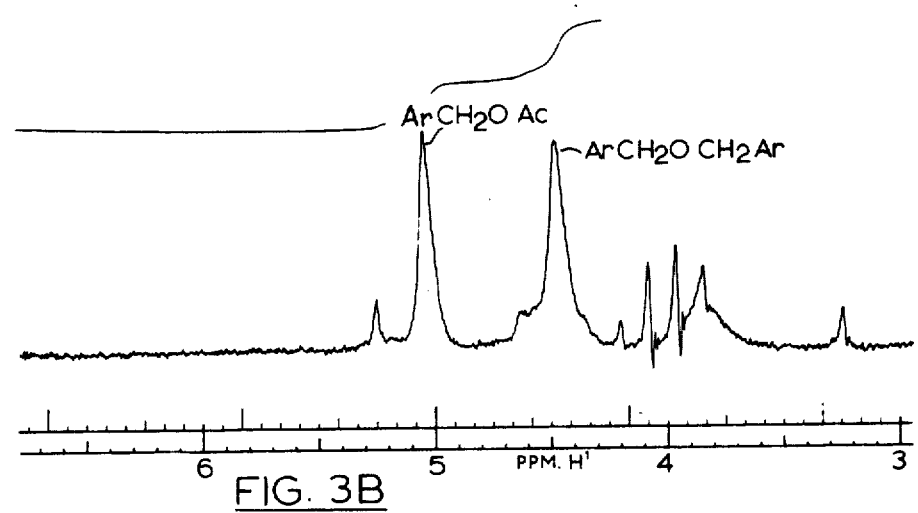
Figure 3C:
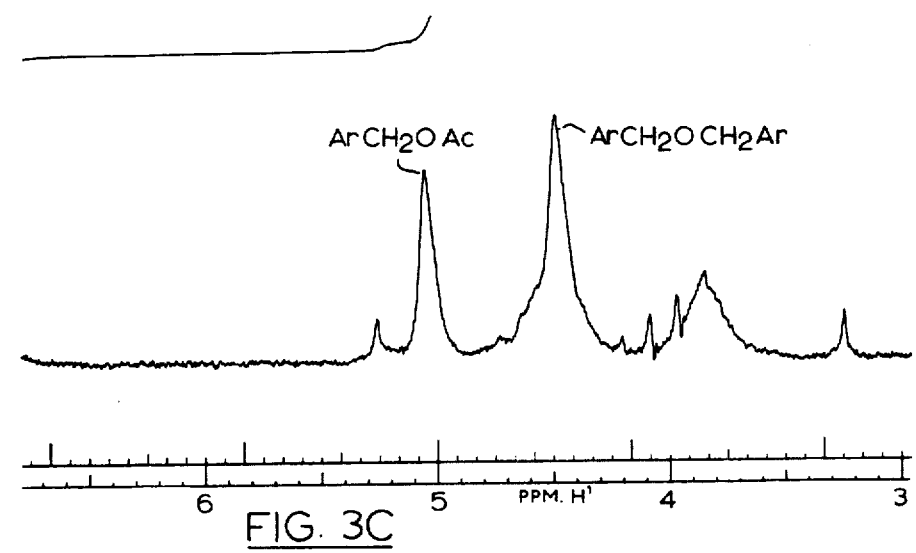

Additional evidence of the formation of a new phenol-formaldehyde resin on addition of controlled quantities of acid to the prior art resins is obtained by the use of Nuclear Magnetic Resonance Spectroscopy (NMR). FIGS. 2A, 2B and 2C show the NMR spectra of the resin prepared according to the above described procedure and the spectra of the same resin 45 minutes and 24 hours after addition of 1% by weight of the resin of toluene sulfonic acid as a 50% aqueous solution thereof, the reaction being carried out at a room temperature of about 70° F. Corresponding spectra of the acetylated resins are given in FIGS. 3A, 3B and 3C. The absorptions attributed to various chemical groups are shown on the spectra.

An examination of the spectra shown in FIGS. 2A, 2B and 2C and FIGS. 3A, 3B and 3C clearly shows that the addition of small quantities of acid at or around room temperature leads to the formation of a new resin that, in its chemical structure, is quite different from the starting resins.

The rate at which the novel resin of the invention is formed depends upon the amount of acid added, the strength of acid used and the temperature. Thus, when 1% toluene sulfonic acid as a 50% solution in water is added and the acidified high viscosity resin (made according to the procedure outlined above is maintained at room temperature (approximately 70° F) the decrease in the IR adsorption band at 1010 $cm^{-1}$ is virtually complete in a matter of five minutes or less as shown by the IR spectra of FIG. 1. However, if half of this amount of acid is added to the same resin that is 0.5% of toluene sulfonic acid (as a 50% solution in water) and the mixture maintained at room temperature (approximately 70° F), there is no detectable change in the IR absorption band at 1010 $cm^{-1}$ even after 2 hours. If, however, the temperature of this mixture is raised to about 140° F., a decrease in the IR absorption band at 1010 $cm^{-1}$ is detectable within 1 hour and is virtually complete within 6 hours.

When more than 1.5% toluene sulfonic acid (as a 50% solution in water) is added to the same high viscosity resin, the novel resin of the invention is formed almost instantly. However, the addition of such a large quantity of acid renders the novel resin quite unstable. Within two hours, the acidified resin gels. This is presumably due to the further condensation of the methylol groups.

It is preferred, therefore, for the production of a stable product having a variety of end uses that, (1) the quantity of acid used to convert the starting resin to the novel resin, and (2) the corresponding temperature of conversion and (3) subsequent storage be carefully controlled. When toluene sulfonic acid is used, between 0.25 and 1.5% of this acid is used, preferably about 0.5 to 1.0% of acid. When the smaller quantities of this acid are used, correspondingly higher temperatures are needed to form the novel resin within a reasonable time. When acid amounts in excess of 1.5% are used, the acidified mixture must be neutralized as soon as the formation of the novel resin is complete, to prevent the novel resin from gelling due to subsequent cross-linking of methylol groups.

When acids other than toluene sulfonic acid are used, the quantity of acid required to form the novel resin may vary according to the inherent strength of the acid. Thus, when phosphoric acid is used 1% to 3% acid may be used to form the novel resin intermediate.

In some end uses of the novel resin of the invention, the acid addition may be delayed until after the initial resin has been applied to a substrate. For example, in the production of composite boards from rice husks or wood chips, a thermosetting phenol-formaldehyde resin of the prior art type may be sprayed, or otherwise applied to the rice husks or wood chips, separately, and thereafter the required amount of acid is sprayed or otherwise applied. The materials may be applied in the reverse order, if desired. In such a case, the required amount of the novel resin is formed on the particles. If the quantity of acid added is not in excess of that required to form the novel resin, the coated particles may be stored for a prolonged period of several weeks. However, at any time the coated particles may be formed into a composite structure by the appropriate application of heat and pressure.

The quantity of acid discussed above for formation of the novel resin is the quantity of acid actually contacting the resin. Thus, for example, this is the case when the acid or its solution is stirred directly into the initial resin. However, in such applications as the production of composite boards from rice husks or wood chips if the resin and the acid or acid solution are sprayed separately, not all the acid may contact the resin. This is also the case when, for example, the initial resin is used as an aqueous emulsion, and the acid is added to the emulsion. In such a case the majority of the acid remains in the aqueous phase and only a small percentage thereof actually contacts the resin. In such cases the minimum quantity of the acid required to form the new resin has to be specifically determined by utilizing the IR spectral band at 1010 $cm^{-1}$ and NMR-spectroscopy. The upper limit of the acid that can be used is more easily determined for, if the actual quantity of acid in the resin phase is too high, the novel resin is unstable, resulting in cross-linking and gelling within an hour or so of acid addition.

Another use for the new resin of the invention is in the manufacture of plywood or other lamina products containing at least one wood lamina or wood-paper composite products. Phenolic resins currently used in the manufacture of plywood are caustic aqueous solutions of phenol-formaldehyde resins. These resins perform as suitable adhesives only when water is present. In the absence of water, the sodium salt of the phenolic polymer has no flow even under heat and pressure. In the manufacture of plywood, immediately after adhesive application, water loss occurs both through soaking into plywood and by evaporation into the air. Consequently, the hot pressing of the plywood has to be completed very soon after the adhesive has been applied to individual pieces of veneer. This severe limitation in the use of thermosetting phenol-formaldehyde resins for plywood adhesive may be readily overcome by using the new resin of the present invention, which has a very long shelf life and good performance characteristics even in the absence of water.

An important aspect of the present invention is the control of tack in phenol-formaldehyde resins which have benzyl ether linkages ortho to the phenolic hydroxyl groups.

In most adhesive applications, whether natural adhesives, such as proteins and starches, or thermoplastic synthetic resins, such as polyvinyl acetate or neoprene-phenolic resin contact cements, or thermosetting synthetic resins, such as melamine formaldehyde, urea formaldehyde and phenol formaldehyde resins, are used, a very important requirements is the ability to control tack. In many applications, such as, shell molding sands and certain types of fiber and composite board operations, the presence of tack is very undesirable. On the other hand, in packaging and caulless particle board manufacture, tack is very desirable or even necessary. Therefore, the ability to control tack, so as to be able to use a thermosetting resin in a variety of applications is important.

The prior art thermosetting phenol-formaldehyde resins containing a benzyl ether linkages ortho to the phenolic hydroxyl groups normally are very tacky. The preparative procedure results in the pressure of about 5 to 10% of free phenol in the resin and, since phenol is a good solvent for this resin, its presence tends to depress the melting point (otherwise known as the "glass transition temperature") of the resins, thereby rendering them tacky at room temperature.

It is mentioned above that the conversion of the prior art resins to the novel resin of the present invention leads to the loss of hemiformal groups and a decrease or disappearance of free phenol in the mixture. Because of the combined effect of these two chemical changes, the novel resin of the invention is substantially tack free. Since, however, the lack of tack in the novel resin is due to the absence of a solvent, such as phenol, the tack may be regenerated at will by the addition of small quantities of a suitable solvent, such as phenol or benzyl alcohol.

The tack may be restored to the novel resin of the invention by heating the resin to a temperature above its glass transition temperature but below its cure temperature. Typically, this temperature may lie in the range of about 100° to 300° F, the degree of tack increasing with temperature. The tack of the novel resin, therefore may be controlled by the use of solvent or elevated temperatures, or a combination of the two. it is less preferred to control tack by the use of temperature when it is proposed to store the tacky resin, since at elevated temperatures, the novel resin is less stable than at normal room temperatures around 70° F.

The tack-free novel phenol-formaldehyde resin of the present invention is stable over long periods of time when stored at temperatures below those above which curing occurs, and hence are usable in various adhesive applications even after prolonged storage. The novel resins, however, cure rapidly on heating to elevated temperatures.

Figure 4:
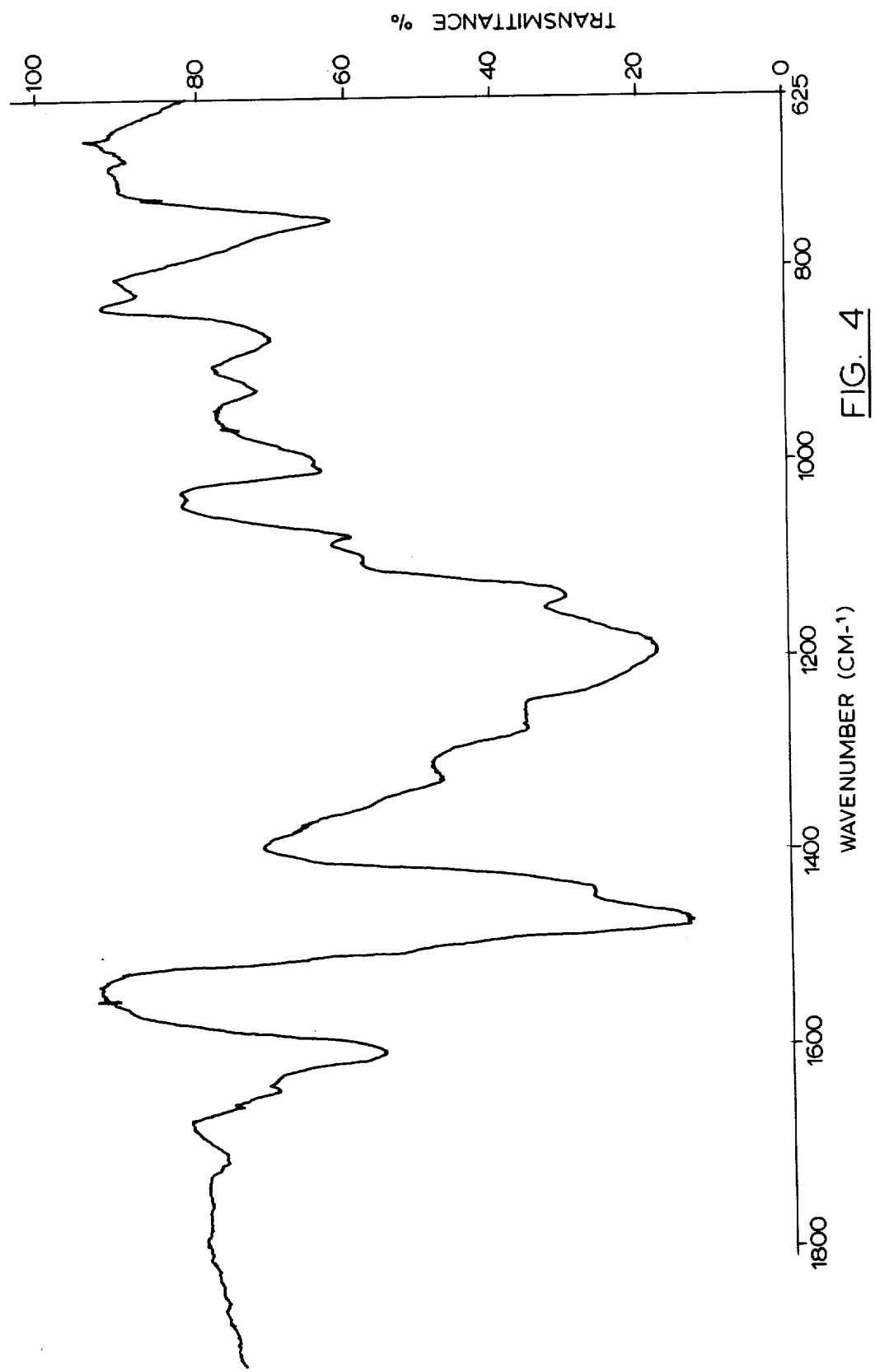
FIG. 4 shows an infra-red spectrum of a fully cured resin.

The production of the novel resin of the invention by the procedure described above represents a totally different reaction from that leading to its cure on subsequent application of heat. On the application of heat, the dibenzyl ether linkages break or rearrange to form methylene linkages. This may be seen from the IR spectrum shown in FIG. 4 of the cured resin produced by curing at 390° for 5 minutes, where the dibenzyl ether absorption band at 1050 cm$^{-1}$ previously present has completely disappeared. The IR spectrum of FIG. 4 also shows the appearance of substitution at the para position, indicated by increased absorbance at 870 cm$^{-1}$ and decreased absorbance at 740 cm$^{-1}$ providing additional evidence of cross-linking.

The conversion of the prior art into a novel resin in accordance with the present invention gives rise to many advantages in industrial usage that are not obtainable with the original resins. The acid curing catalyst may for example be applied at the same time as the resin without undue loss of storage stability and with the added advantage of fast cure rates on application of heat. This provides considerable flexibility in industrial operations, a flexibility that is presently not available with low cost, one component thermosetting resins. Additionally, the tack of the initial resin may be controlled at will from no tack to a tacky system, by controlling the proportion of the novel resin intermediate which is formed, or by controlling the proportion of free solvent which is present.

EXAMPLES

Example 1

A high viscosity resin was prepared using the two-step procedure outlined above at a mole ratio of formaldehyde to phenol of 1.6:1, the initial exothermic step being carried out at a temperature of about 70° C and the polymerization step being carried out at a temperature of about 100° C for 210 minutes.

An infrared absorption spectrum of this resin was obtained. Toluene sulfonic acid, 0.5% based upon the resin weight using a 50% solution in water was then added to the resins and the infrared absorption spectra at various times after the acid addition were obtained.

The absorbance values at wave numbers 1010 cm$^{-1}$ (using a base line drawn between 950 cm$^{-1}$ and 1030 cm$^{-1}$) and at 1230 cm$^{-1}$ (using a base line drawn between 1130 cm$^{-1}$ and 1310 cm$^{-1}$) were calculated. The results obtained are set forth in Table 1 below:

Table I

| Absorbance Ratio 1010 cm$^{-1}$/1230 cm$^{-1}$ | | | |
|---|---|---|---|
| Before Acid Addition | After Acid Addition* | Time After Acid Addition (mts.) | % Decrease |
| 0.19 | 0.04 | 5 | 79 |
|  | 0.07 | 135 | 63 |
| 0.29 | 0.02 | 5 | 93 |

*Because of very small residual absorption at 1010 cm$^{-1}$ after acid addition, these determinations can only be of an order of magnitude and have an inherent limit of accuracy.

The resin, after acid addition was placed on a hot plate at 350° F. The resin melted and soon thereafter set to an infusible brittle mass.

EXAMPLE 2

This example illustrates the control of tack when the novel resins are used as binders on non-porous substrates such as sands used in shell molding in foundry practice.

A resin was made according to the procedure outlined in Example 1 except that the second stage heating step was shortened. This resin was used to coat foundry sand and the quantity of resin used was 3% by weight of sand. Two product samples were prepared as follows:

a. The resin with a viscosity of over 60 Kreb units at 120° F and having a resin solid content of 82% was coated on warm sand having a temperature of about 120° F by rubbing. The sand was cooled and stored at room temperature.

b. The resin with a viscosity of over 60 Kreb units at 120° F and having a resin solid content of 82% was modified by the addition of 0.5% toluene sulfonic acid (as a 50% solution in water) and coated on warm sand having a temperature of about 120° F by rubbing. The sand was cooled and stored at room temperature.

c. The resin with a viscosity of over 60 Kreb units and having a resin solid content of 82% was modified by the addition of 4% toluene sulfonic acid (added as a 50% aqueous solution thereof) and coated on warm sand having a temperature of about 120° F by rubbing. The sand was cooled and stored at room temperature.

The samples (a), (b) and (c) were preiodically examined. At the end of 24 hours the sample (a) was still tacky, whereas samples (b) and (c) were quite dry and freeflowing.

After 24 hours storage, all three samples of coated sand, samples (a), (b) and (c) were used to form standard foundry dog bones by air blowing into the hot mold. Sample (a) gave a dog bone that has very poor strength characteristics, while sample (b) gave very acceptable specimens. On examination, it was found that sample (a) did not fill the mold completely, presumably because the sand was tacky and not free-flowing, in contrast to sample (b), which was free-flowing.

Sample (c) failed to bind at all, although the individual sand particles changed to a dark brown color showing precure of resin.

EXAMPLE 3

This example illustrates the use of the novel resin of the present invention in composite board manufacture.

A resin having a viscosity of over 100 Kreb units at 120° F was prepared using the procedure outlined in Example 1. Three product samples were prepared utilizing this resin, as follows:

a. The resin was coated on rice husks in a quantity of 10% by weight of husk.

b. The resin, after addition of 3% by weight of toluene sulfonic acid thereto, (as a 50% aqueous solution thereof), was coated on rice husk in a quantity of 10% by weight of husk.

c. The resin, after addition of 0.5% by weight of toluene sulfonic acid thereto (as a 50% aqueous solution thereof), was coated on rice husk in a quantity of 10% by weight of husk.

Samples (a), (b) and (c) were examined periodically. It was found that all three samples were quite tacky when freshly coated. Sample (a) became tack-free after 24 hours due to absorption of the free phenol by the rice husks, sample (b) became tack-free after 2 hours and sample (c) became tack-free after 6 hours.

The tack on samples (a) and (c) could be regenerated by addition of 1% phenol (based upon husk weight) or benzyl alcohol.

It is concluded, therefore, that the disappearance of tack is due to the loss of the low molecular weight components, which in turn raises its melting point. In the case of sample (a), the loss of molecular weight components occurs by absorption into the porous husks, whereas in the case of samples (b) and (c) the loss of the low molecular weight components both by absorption and chemical reaction. It was also found in the case of samples (a) and (c), the tack may be partially restored by warming the resin coated husk to slightly above the ambient temperature.

After 24 hours, the coated husk from all three samples was formed into individual mats and hot pressed for 8, 10, 12, 14 and 16 minutes each. Boards, ⅜ inches thick and 50 lbs./ft.$^3$ in density were made using a press temperature of 390° F.

Sample (a) required sixteen minutes to form a good board. Sample (b) did not give a good board under any of the conditions used. Sample (c) gave a good board at 10 minutes press time.

The experiment was repeated with Sample (b), except that this time the boards were hot pressed immediately after coating the resin onto the husk. A good board was made at 10 minutes press time.

The above examples illustrate how, under different application conditions, acid addition, resin viscosity and substrate characteristics can be judiciously combined to control tack and other performance characteristics. The discovery of the fact that the prior art resins do not cure on the addition of small quantity of acids at room temperature, but simply change to another new form, still retaining their thermosetting character, may not only be used to reduce tack by acid addition, as in the case of shell molding, but also enables one to introduce tack by the addition of phenol or solvents, as in the case of wood chips and rice husks.

It should be emphasized that the invention claimed should not be considered to be restricted in use to controlling tack in shell molding and in composite boards. These examples, are merely illustrations to describe the scope of the invention on both porous and non-porous substrates, where control of tack along with other desirable characteristics such as storage stability and fast cure is required.

SUMMARY

The present invention, therefore, provides a novel phenol-formaldehyde thermosetting resin containing a preponderance of benzyl ether linkages ortho to the phenolic hydroxyl groups and having a distinctive infra-red spectrum which is rapidly curable to a thermoset stage. The novel resin is capable of controlling the tack of phenol-formaldehyde resin compositions for many end uses.

Modifications are possible within the scope of the invention.

What we claim is:

1. A method for the production of a thermosetting phenol-formaldehyde resin, which comprises:
    reacting phenol with formaldehyde in an aqueous reaction medium in the presence of a metal carboxylate catalyst therefor to form a thermosetting phenol-formaldehyde resin having benzyl ether linkages and hemiformal groups ortho to the phenolic hydroxyl groups and an infra-red spectrum which displays large absorption at wave numbers of approximately 1230 cm$^{-1}$, 1050 cm$^{-1}$ and 1010 cm$^{-1}$, contacting said resin with at least one strong acid to cause a decrease of at lest 35% in the ratio of absorbance at 1010 cm$^{-1}$, measured from a base line drawn between wave numbers of 1030 cm$^{-1}$ and 950 cm$^{-1}$, to that at 1230 cm$^{-1}$, measured from a base line drawn between wave number of 1130 cm$^{-1}$ and 1310 cm$^{-1}$, to a value less than about 0.1, while leaving substantially unaffected the absorption at wave numbers of 1230 cm$^{-1}$ and 1050 cm$^{-1}$, and recovering the resulting thermosetting phenol-formaldehyde resin having a preponderance of benzyl ether linkages ortho to the phenolic hydroxyl groups, having substantially no tendency to cure upon extensive standing at ambient temperature and being capable of rapid cure at elevated temperature.

2. The method of claim 1 wherein said strong acid is an aryl sulfonic acid.

3. The method of claim 2 wherein said strong acid is selected from benzene sulfonic acid and toluene sulphonic acid, used in an amount of from about 0.25 to about 1.5% by weight.

4. The method of claim 3, wherein said strong acid is used in an amount of from about 0.5 to about 1.0% by weight of said resin.

5. The method of claim 1, wherein said decrease in the ratio of absorption at a wave number of 1010 cm$^{-1}$ is from about 60 to about 95% to a value less than about 0.07.

6. The method of claim 1, wherein said first-formed resin is tacky and said contact of said resin with acid is carried out at least until the resulting resin is substantially tack-free.

7. The method of claim 6 including controlling the tack of said tack-free resin after formation thereof.

8. The method of claim 7 wherein said tack control is achieved by mixing with said tack-free resin a controlled amount of an organic solvent therefor to provide a controlled tackiness in the latter resin.

9. The method of claim 8, wherein said organic solvent is phenol or benzyl alcohol.

10. The method of claim 1, wherein the mole ratio of formaldehyde to phenol is at least about 1.5:1.

11. The method of claim 10, wherein said mole ratio of formaldehyde to phenol is about 1.5 to about 1.6:1.

12. The method of claim 1, wherein said contacting of said resin with said at least one strong acid takes place at a room temperature of about 70° F.

13. The method of claim 1 wherein said first-mentioned thermosetting phenol-formaldehyde resin is formed by a two-step reaction in which a first exothermic step is carried out until said exotherm subsides at a temperature of about 60° to about 80° C and a second step is carried out at a temperature of about 90° to about 100° C until the desired degree of polymerization is achieved.

14. The method of claim 13 wherein said second stage is carried out at about 100° C until said resin has a viscosity of at least about 50,000 cps at 75° F.

15. A thermosetting phenol-formaldehyde resin having a preponderance of benzyl ether linkages ortho to the phenolic hydroxyl groups, having substantially no tendency to cure upon extensive standing at ambient temperature, being capable of rapid cure at elevated temperature, and characterized by an infra-red spectrum having the following features:

a. exhibiting large absorption peaks at wave numbers of approximately 1050 cm$^{-1}$ and 1230 cm$^{-1}$, and b. a ratio of absorbance at a wave number of 1010 cm$^{-1}$, measured from a base line drawn between wave numbers of 1030 cm$^{-1}$ and 950 cm$^{-1}$, to that at a wave number of 1230 cm$^{-1}$, measured from a base line drawn between wave numbers of 1130 cm$^{-1}$ and 1310 cm$^{-1}$, which is less than about 0.1, said resin being produced by the method of claim 1.

16. The resin of claim 15, wherein said ratio of absorbance is less than about 0.07.

* * * * *